（12）United States Patent
Kamizono et al.

(10) Patent No.: US 7,966,739 B2
(45) Date of Patent: Jun. 28, 2011

(54) LASER SURVEYING SYSTEM

(75) Inventors: Fumihiko Kamizono, Itabashi-ku (JP);
Kunihiro Hayashi, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 340 days.

(21) Appl. No.: 12/287,521

(22) Filed: Oct. 10, 2008

(65) Prior Publication Data

US 2009/0106989 A1    Apr. 30, 2009

(30) Foreign Application Priority Data

Oct. 26, 2007   (JP) .................................. 2007-278668

(51) Int. Cl.
*G01C 15/00*   (2006.01)
*G01C 3/08*   (2006.01)

(52) U.S. Cl. ............................... 33/290; 33/285; 356/4.01

(58) Field of Classification Search ..................... 33/281, 33/285, 290; 356/4.01, 3.1, 3.11, 622, 141.1
See application file for complete search history.

(56) References Cited

U.S. PATENT DOCUMENTS

| | | | | |
|---|---|---|---|---|
| 5,589,939 | A | * | 12/1996 | Kitajima ........................ 356/622 |
| 5,751,408 | A | * | 5/1998 | Ohtomo et al. ............... 356/5.14 |
| 5,977,534 | A | * | 11/1999 | Green et al. ................. 250/206.1 |
| 6,031,601 | A | | 2/2000 | McCusker et al. ............ 356/5.01 |
| 6,873,406 | B1 | | 3/2005 | Hines et al. .................. 356/141.1 |
| 7,474,388 | B2 | | 1/2009 | Ohtomo et al. ............... 356/4.07 |
| 2002/0060788 | A1 | * | 5/2002 | Ohtomo et al. ............ 356/139.1 |
| 2005/0002015 | A1 | | 1/2005 | Lin et al. ...................... 356/5.01 |
| 2007/0103698 | A1 | | 5/2007 | Liu et al. ........................ 356/620 |
| 2007/0103699 | A1 | * | 5/2007 | Kohnen et al. ................ 356/620 |
| 2007/0263202 | A1 | * | 11/2007 | Ohtomo et al. .............. 356/4.01 |

FOREIGN PATENT DOCUMENTS

| | | |
|---|---|---|
| GB | 2 437 384 | 10/2007 |
| JP | 2006-337302 | 12/2006 |
| WO | 94/05970 | 3/1994 |

OTHER PUBLICATIONS

Radar Conference, 1999. The Record of the 1999 IEEE Waltham, MA, USA Apr. 20-22, 1999, Piscataway, NJ, USA, IEEE, US Apr. 20, 1999; pp. 90-95; XP010335073; Wren, J E et al.; "Constant False Alarm Rate Detection of Wake Vortices with Application to a Pulsed Doppler Lidar System".
The European communication dated Jan. 23, 2009.

* cited by examiner

*Primary Examiner* — R. A. Smith
(74) *Attorney, Agent, or Firm* — Nields, Lemack & Frame, LLC

(57) ABSTRACT

A rotary laser projecting device comprising a reference plane forming unit that projects two or more fan-shaped laser beams, a distance measuring unit that projects distance measuring light, a rotator for projecting the fan-shaped laser beams and the distance measuring light by rotary irradiation, a horizontal angle detecting unit, a photodetection unit for receiving the reflected fan-shaped laser beams and the reflected distance measuring light, a storage unit, and a control arithmetic unit is disclosed. The control arithmetic unit measures elevation angle of the object reflector from time difference of photodetection between the two or more laser beams, measures horizontal angle of the object based on the result of detection of the horizontal angle detecting unit when at least one of the reflected fan-shaped laser beams and the reflected distance measuring light is received and the distance measuring unit measures a distance to the object to be measured.

10 Claims, 8 Drawing Sheets

LASER SURVEYING SYSTEM

BACKGROUND OF THE INVENTION

The present invention relates to a laser surveying system for projecting laser beams by rotary irradiation and for performing measurement on an object to be measured.

A type of laser surveying system is already known, which performs a distance measurement by projecting a distance measuring light by rotary irradiation, and detects horizontal angle and elevation angle by projecting two or more fan-shaped laser beams with at least one of the beams tilted by rotary irradiation, and measures three-dimensional data.

The laser surveying system as described above comprises a measuring device and a photodetection device. The measuring device projects distance measuring light and fan-shaped laser beams by rotary irradiation, measures a distance to the object to be measured by receiving reflected distance measuring light from the object to be measured, also obtains horizontal angle at the moment of photodetection, and transmits the result of measurement to the photodetection device.

The photodetection device as described above receives two or more fan-shaped laser beams and obtains elevation angle at photodetecting position of the photodetection device based on the difference of photodetection time when the fan-shaped laser beams are received and also based on tilt angles of the fan-shaped laser beams. Further, based on the elevation angle thus obtained and based on the result of the measurement transmitted from the measuring device, the photodetection device acquires horizontal angle, and acquires three-dimensional data on the photodetection device by calculating a height based on the result of distance measurement and the elevation angle.

Or, by transmitting the elevation angle from the photodetection device to the measuring device, and three-dimensional data of the photodetection device were calculated at the measuring device.

The laser surveying system as described above is disclosed in JP-A-2006-337302.

In the laser surveying system as given above, it is necessary to have a photodetection unit for detecting fan-shaped laser beams as an object to be measured and a photodetection device provided with an arithmetic unit, which calculates elevation angle based on the results of photodetection. Also, it is necessary to have communication means for transmitting and receiving the results of calculation or the like to and from the measuring device and the photodetection device.

As a result, the arrangement of the system is complicated and costly.

JP-A-2006-337302 discloses a measuring device, which projects fan-shaped laser beams in N-shaped form by rotary irradiation, projects distance measuring light by rotary irradiation, and measures a distance to the object to be measured by receiving reflection light from the object to be measured. In this measuring device, when the distance measuring light is projected by rotary irradiation, distance measurement can be performed on two or more objects to be measured at the same time. Therefore, based on the measured elevation angle and the measured distance, a position of direction of height with respect to the object to be measured, i.e. the object to be measured, can be measured.

SUMMARY OF THE INVENTION

It is an object of the present invention to provide a laser surveying system, by which it is possible to measure three-dimensional data on an object to be measured.

To attain the above object, the present invention provides a laser surveying system, comprising: a rotary laser projecting device and an object reflector, wherein the rotary laser projecting device comprises a reference plane forming unit for forming a reference plane by projecting fan-shaped laser beams which spread in vertical direction and have two or more laser beams including at least one thereof tilted, a distance measuring unit for measuring distance by projecting distance measuring light, a rotator for projecting said fan-shaped laser beams and said distance measuring light in horizontal direction by rotary irradiation, a horizontal angle detecting unit for detecting horizontal angle of the rotator, a photodetection unit for receiving the reflected fan-shaped laser beams and the reflected distance measuring light, a storage unit, and a control arithmetic unit for controlling said reference plane forming unit, said distance measuring unit and said rotator, and wherein the object reflector reflects said fan-shaped laser beams and said distance measuring light toward said rotary laser projecting device, wherein said control arithmetic unit measures elevation angle of said object reflector from time difference of photodetection between said two or more laser beams, measures horizontal angle of the object to be measured based on the result of detection of said horizontal angle detecting unit when at least one of said reflected fan-shaped laser beams and said reflected distance measuring light is received and said distance measuring unit measures a distance to the object to be measured. Also, the present invention provides the laser surveying system as described above, wherein said control arithmetic unit controls constant speed rotation of said rotator, judges that photodetection signals from said photodetection unit comprise two or more photodetection signals, and judges whether the photodetection signals of two or more laser beams are photodetection signals on said object reflector or a photodetection signals on unnecessary reflector other than the object reflector, depending on whether photodetection signals of said two or more laser beams are received within a predetermined time period. Further, the present invention provides the laser surveying system as described above, further comprising a signal processing unit for processing signals from said photodetection unit, wherein said control arithmetic unit decreases gain on the photodetection signals by said signal processing unit in case where there are two or more sets of photodetection signals of said two or more laser beams received within a predetermined time period, and excludes photodetection signals from unnecessary reflector. Also, the present invention provides the laser surveying system as described above, further comprising a signal processing unit for processing signals from said photodetection unit, wherein said control arithmetic unit increases gain on the photodetection signals by said signal processing unit in case where photodetection signal from the photodetection unit cannot be acquired. Further, the present invention provides the laser surveying system as described above, further comprising a display unit, said control arithmetic unit further comprises a signal processing unit for processing signal from said photodetection unit, and wherein said control arithmetic unit stops measurement operation and displays horizontal angle of said two or more sets of photodetection signals on said display unit in case where there are two or more sets of photodetection signals of said two or more laser beams received in a predetermined time period. Also, the present invention provides the laser surveying system as described above, wherein said control arithmetic unit prepares a standard clock signal and performs matching of said standard clock signal with an angle signal from said horizontal angle detecting unit, determines time when said reflected distance measuring light is received, and based on the measured distance, calculates the time of reciprocal running of the distance measuring light between the object to be measured and a distance measuring unit, and calculates horizontal angle of the object to be measured by the time of reciprocal running when the reflected distance measuring light is received and from the matching of the standard clock signal with said angle signal. Further, the present invention provides the laser surveying system as described above, wherein a rotary laser projecting device modulates at least on said fan-shaped laser beams among the projected fan-shaped laser beams and the projected distance measuring light, and the rotary laser projecting device judges whether the received reflected light is the projected fan-shaped laser beam of its own by detecting the modulation. Also, the present invention provides the laser surveying system as described above, wherein said photodetection unit comprises a first photodetection unit for receiving the reflected distance measuring light and a second photodetection unit for receiving the reflected fan-shaped laser beam. Further, the present invention provides the laser surveying system as described above, wherein said first photodetection unit and said second photodetection unit are designed as a common photodetection unit.

The present invention provides the laser surveying system, comprising a rotary laser projecting device and an object reflector, wherein the rotary laser projecting device comprises a reference plane forming unit for forming a reference plane by projecting fan-shaped laser beams which spread in vertical direction and have two or more laser beams including at least one thereof tilted, a distance measuring unit for measuring distance by projecting distance measuring light, a rotator for projecting said fan-shaped laser beams and said distance measuring light in horizontal direction by rotary irradiation, a horizontal angle detecting unit for detecting horizontal angle of the rotator, a photodetection unit for receiving the reflected fan-shaped laser beams and the reflected distance measuring light, a storage unit, and a control arithmetic unit for controlling said reference plane forming unit, said distance measuring unit and said rotator, and wherein the object reflector reflects said fan-shaped laser beams and said distance measuring light toward said rotary laser projecting device, wherein said control arithmetic unit measures elevation angle of said object reflector by time difference of photodetection between said two or more laser beams, measures horizontal angle of the object to be measured based on the result of detection of said horizontal angle detecting unit when at least one of said reflected fan-shaped laser beams and said reflected distance measuring light is received and said distance measuring unit measures a distance to the object to be measured. As a result, by the rotary laser projecting device only, a distance, a horizontal angle and an elevation angle can be measured on an object to be measured and three-dimensional data on the object to be measured can be easily acquired.

Also, the present invention provides the laser surveying system as described above, wherein said control arithmetic unit controls constant speed rotation of said rotator, judges that photodetection signal from said photodetection unit comprises two or more photodetection signals, and judges whether the photodetection signals of two or more laser beams are photodetection signals on said object reflector or photodetection signals on unnecessary reflector other than the object reflector, depending on whether photodetection signals of said two or more laser beams are received within a predetermined time period. As a result, even when reflection light is received from unnecessary reflector, photodetection signals from the object reflector can be easily recognized and measurement operation can be performed.

Further, the present invention provides the laser surveying system as described above, further comprising a signal processing unit for processing signals from said photodetection unit, wherein said control arithmetic unit decreases gain on the photodetection signal by said signal processing unit in case where there are two or more sets of photodetection signals of said two or more laser beams received within a predetermined time period, and excludes photodetection signals from unnecessary reflector. As a result, even when reflection light is received from unnecessary reflector, photodetection signals from the object reflector can be easily recognized and measurement operation can be performed.

Also, the present invention provides the laser surveying system as described above, further comprising a signal processing unit for processing signals from said photodetection unit, wherein said control arithmetic unit increases gain on the photodetection signals by said signal processing unit in case where photodetection signal from the photodetection unit cannot be acquired. As a result, even when light quantity of the reflection light from the object to be measured is small, the reflection light can be received, and photodetection signals from the object reflector can be recognized and measurement can be performed.

Further, the present invention provides the laser surveying system as described above, further comprising a display unit, wherein said control arithmetic unit further comprises a signal processing unit for processing signal from said photodetection unit, and wherein said control arithmetic unit stops measurement operation and displays horizontal angle of said two or more sets of photodetection signals on said display unit in case where there are two or more sets of photodetection signals, of said two or more laser beams received in a predetermined time period. As a result, a continuation of useless measurement operation can be prevented, and the operator can easily judge a situation to stop measurement operation.

Also, the present invention provides the laser surveying system as described above, wherein said control arithmetic unit prepares a standard clock signal and performs matching of said standard clock signal with angle signal from said horizontal angle detecting unit, determines time when said reflected distance measuring light is received, and based on the measured distance, calculates the time of reciprocal running of the distance measuring light between the object to be measured and a distance measuring unit, and calculates horizontal angle of the object to be measured by the time of reciprocal running when the reflected distance measuring light is received and from the matching of the standard clock signal with said angle signal. As a result, even when the distance to the object to be measured is long and the influence of error caused by rotation of the rotator is not negligible, the horizontal angle can be accurately measured.

Further, the present invention provides the laser surveying system as described above, wherein the rotary laser projecting device modulates at least on said fan-shaped laser beams among the projected fan-shaped laser beams and the projected distance measuring light and the rotary laser projecting device judges whether the received reflected light is the projected fan-shaped laser beam of its own by detecting the modulation. As a result, even in the working condition where two or more rotary laser projecting device are used, an erroneous operation and an inaccurate measurement can be prevented.

DETAILED DESCRIPTION OF THE PREFERRED EMBODIMENT

Figure 1:
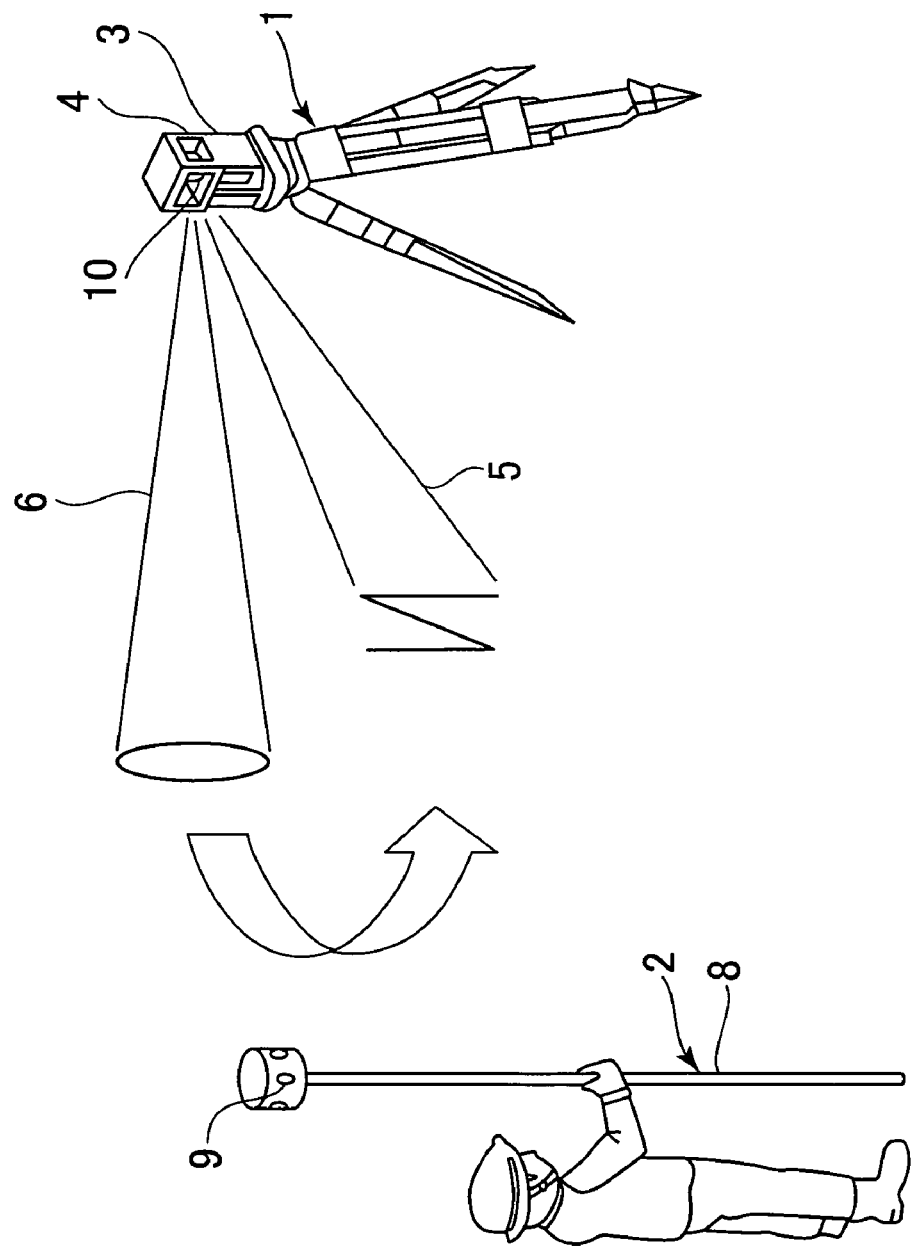
FIG. 1 is a schematical perspective view to explain measurement by using a laser surveying system according to an embodiment of the present invention.

Description will be given below on the best mode for carrying out the invention by referring to the attached drawings.

First, referring to FIG. 1, description will be given on approximate arrangement of the present invention.

The laser surveying system according to the present invention comprises a rotary laser projecting device 1 used as a measuring device and an object to be measured 2. the rotary laser projecting device 1 projects two or more fan-shaped laser beams 5, which are continuous scanning light beams,—preferably three fan-shaped laser beams, of which two laser beams at both peripheral ends are perpendicularly with respect to the horizontal plane and a central beam are tilted at a predetermined tilt angle with respect to the horizontal plane, and these three laser beams are combined together in N-shaped form. The rotary laser projecting device 1 also projects a distance measuring light 6, i.e. pulsed light, by rotary irradiation.

The object to be measured 2 comprises a rod 8 which can be manually handled by an operator and two or more corner cubes 9 mounted on the rod 8 as reflection mirrors. The lower end of the rod 8 is designed with a tapered so that the rod can be installed accurately at a known point or the like.

The rotary laser projecting device 1 comprises a reference plane forming unit 3 and a distance measuring unit 4, and it is installed at a known point. The reference plane forming unit 3 projects the fan-shaped laser beams 5, which are continuous light beams, via a rotator 10 at a constant velocity by rotary irradiation. The distance measuring unit 4 projects the distance measuring light 6 from a distance measuring light projecting unit 4a, and the distance measuring light 6 can be projected by rotary irradiation via the rotator 10. It may be so designed that the reference plane forming unit 3 and the distance measuring unit 4 commonly use a single rotator 10, or that there are provided rotators 10 and 10 independently driven, and the fan-shaped laser beams 5 and the distance measuring light 6 are projected by rotary irradiation separately via the rotators 10, 10.

It is so designed that the fan-shaped laser beams 5 and the distance measuring light 6 are projected with a certain predetermined angle difference in rotating direction (horizontal direction) by rotary irradiation, and that the fan-shaped laser beams 5 are projected prior to the distance measuring light 6 by rotary irradiation.

Figure 2:
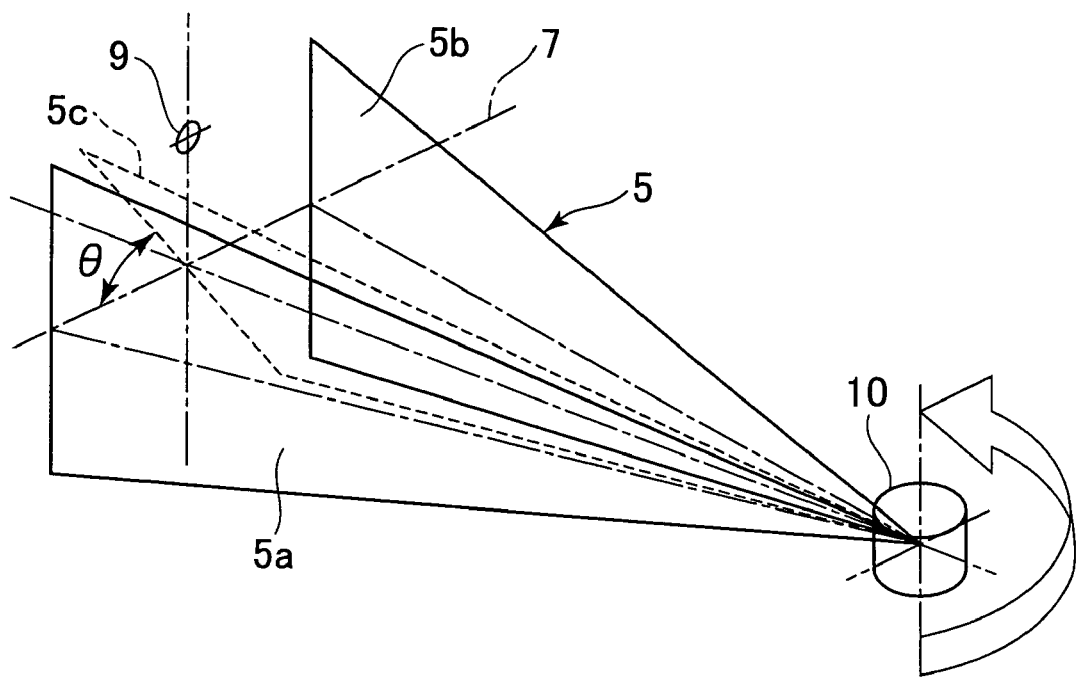
FIG. 2 is a schematical drawing to explain measurement of elevation angle by using fan-shaped laser beams in the embodiment of the invention.

The reference plane forming unit 3 projects the fan-shaped laser beams 5 at a constant velocity by rotary irradiation and forms a horizontal reference plane 7 (see FIG. 2). The horizontal reference plane 7 is defined as a horizontal plane which the centers of cross-sections of luminous fluxes of the fan-shaped laser beams 5 form.

As shown in FIG. 2, the fan-shaped laser beams 5 are made up of two or more fan-shaped laser beams (in the figure, three fan-shaped laser beams are shown) which spread in vertical direction as described above. The fan-shaped laser beam at the center is tilted at a known angle $\theta$ with respect to the horizontal plane, and the other two fan-shaped laser beams at both peripheral ends are vertical with respect to the horizontal plane. Because the fan-shaped laser beams 5 spread in vertical direction, the object to be measured 2 can reflect the fan-shaped laser beams 5 easily and at positions widely spread in vertical direction.

Figure 3:
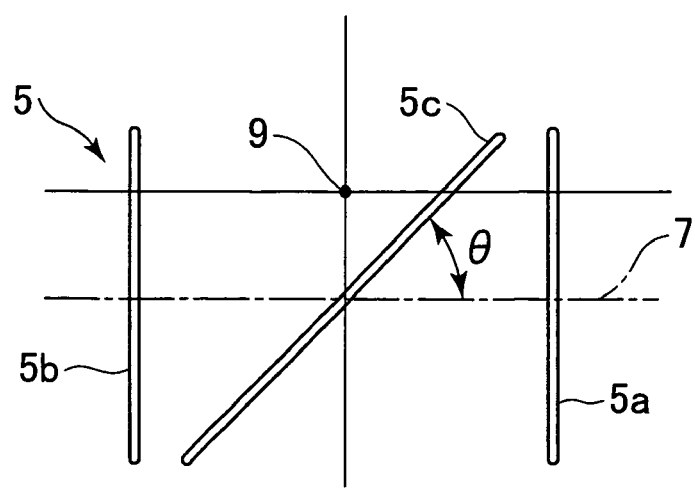
FIG. 3 is a schematical drawing to explain measurement of elevation angle by using fan-shaped laser beams in the embodiment of the invention.

As shown in FIG. 3, the fan-shaped laser beams 5 are made up by three fan-shaped laser beams and the cross-sections of the luminous fluxes are in N-shaped form. In FIG. 3, reference numeral 9 denotes a corner cube. The rotary laser projecting device 1 has a second photodetection unit (to be described later), and a photodetection plane of the second photodetection unit is formed as a point or a spot-like region with small area.

In FIG. 1, though the fan-shaped laser beams 5 and the distance measuring light 6 are projected at upper position and at lower position respectively, a certain predetermined horizontal angle may be set between projecting direction of the fan-shaped laser beams 5 and projecting direction of the distance measuring light 6 so that the fan-shaped laser beams 5 and the distance measuring light 6 are projected along the same plane.

As shown in FIG. 2 and FIG. 3, the fan-shaped laser beams 5 are projected by rotary irradiation and the fan-shaped laser beams 5 are comprised by three fan-shaped laser beams 5a, 5b and 5c. When the fan-shaped laser beams 5, i.e. the fan-shaped laser beams 5a, 5b, and 5b, pass the object to be measured 2, the fan-shaped laser beams 5a, 5b and 5c are reflected respectively from the corner cube 9. The second photodetection unit 11 receives the reflected fan-shaped laser beams 5a', 5b' and 5c'. When the second photodetection unit 11 receives each of the reflected fan-shaped laser beams 5a', 5b' and 5c', time deviation occurs. By finding the time deviation at the time of light receiving (photodetection), an elevation angle with respect to the horizontal reference plane 7 can be obtained from the time deviation and the tilt angle $\theta$ of the tilted fan-shaped laser beam 5c.

Here, the time deviation of photodetection of the reflected fan-shaped laser beam 5a' and the reflected fan-shaped laser beam 5b' is defined as a standard S. Then, a ratio of the standard S to the time deviation between the reflected fan-shaped laser beam 5a' and the reflected fan-shaped laser beam 5c' is obtained, and a ratio of the standard S to the time deviation between the reflected fan-shaped laser beam 5c' and the reflected fan-shaped laser beam 5b' is obtained. Based on these ratios and the tilt angle θ, the elevation angle is calculated.

By defining the standard S as a reference standard, the elevation angle can be measured with high accuracy even when velocity is changed in the projection of the fan-shaped laser beams 5 by rotary irradiation.

The second photodetection unit 11 detects the reflected fan-shaped laser beams 5a', 5b' and 5c'. According to horizontal angle at the time of detection, a position (a horizontal angle) of the object to be measured 2 can be identified. By projecting the distance measuring light in direction toward the object to be measured 2 and by receiving the reflected distance measuring light, a distance D to the object to be measured 2 can be measured. Further, based on the distance D and the elevation angle, a height of the object to be measured 2 can be calculated.

Then, by measuring a direction, a distance and a height of the object to be measured 2, three-dimensional data for the object to be measured 2 can be acquired.

Figure 4:
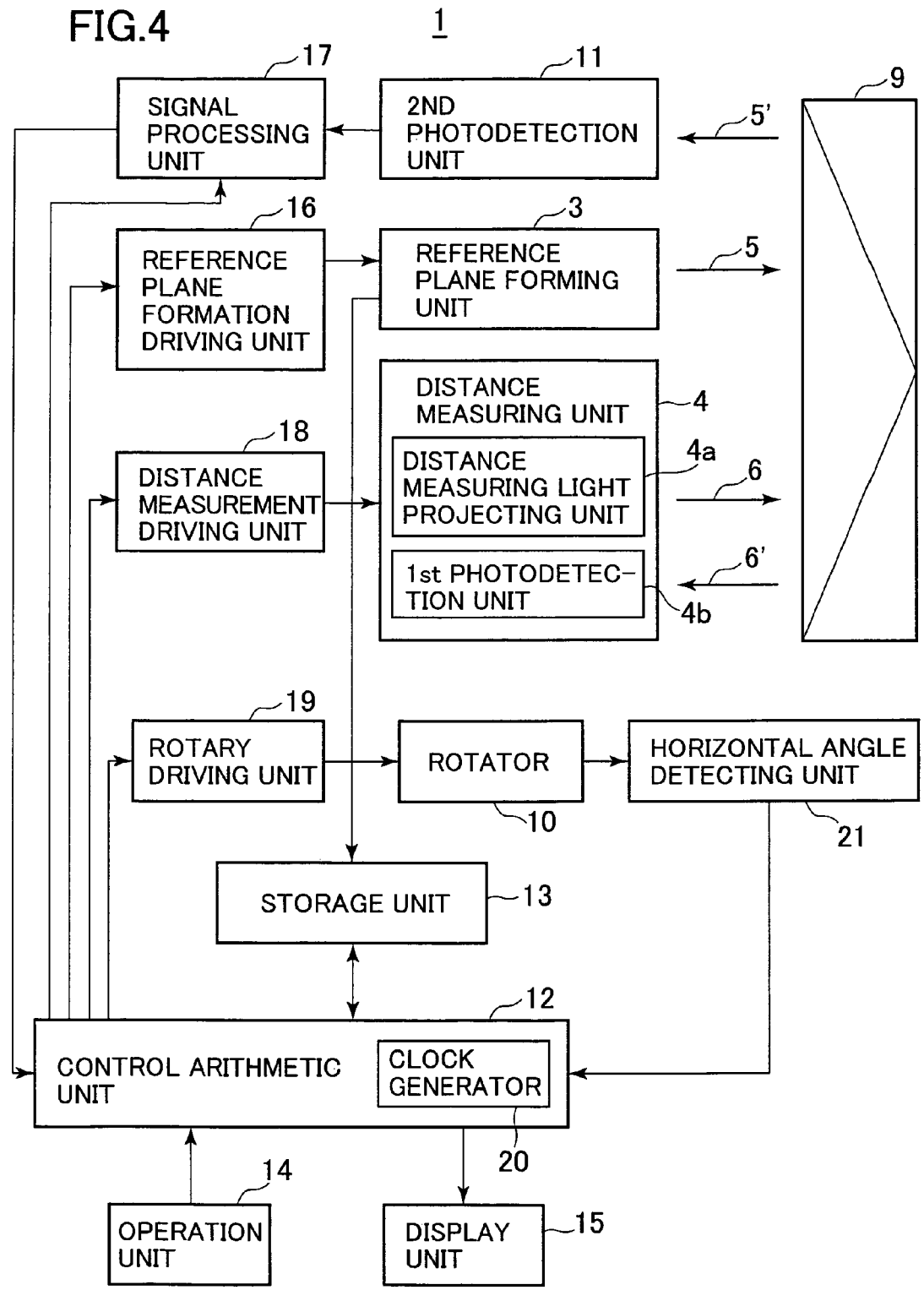
FIG. 4 is a block diagram of a rotary laser projecting device according to the embodiment of the invention.

Next, referring to FIG. 4, description will be given on approximate arrangement of the rotary laser projecting device 1.

The rotary laser projecting device 1 primarily comprises the reference plane forming unit 3, the distance measuring unit 4, the rotator 10, the second photodetection unit 11, a control arithmetic unit 12, a storage unit 13, an operation unit 14, and a display unit 15.

According to an instruction from the control arithmetic unit 12, the reference plane forming unit 3 controls light emission of the fan-shaped laser beams 5 via a reference plane formation driving unit 16. The reflected fan-shaped laser beams 5' from the corner cube 9 are received by the second photodetection unit 11. Photodetection signals issued from the reference plane forming unit 3 are given necessary processes such as amplification, A/D conversion, etc. at a signal processing unit 17, and the photodetection signals are sent to the control arithmetic unit 12. Based on the signals from the signal processing unit 17, the control arithmetic unit 12 sets up proper gain for amplification at the signal processing unit 17. The control arithmetic unit 12 comprises a clock generator 20 (to be described later) for synchronization of signal processing.

According to an instruction from the control arithmetic unit 12, the distance measuring unit 4 controls light emission of the distance measuring light 6 via a distance measurement driving unit 18. A projection of the distance measuring light 6 from the distance measuring light projecting unit 4a is controlled. The reflected distance measuring light is received by a first photodetection unit 4b, and measurement is carried out.

According to an instruction from the control arithmetic unit 12, the rotator 10 is controlled via a rotary driving unit 19, and rotation control at constant velocity is executed. A rotation angle (a horizontal angle) of the rotator 10 is detected by a horizontal angle detecting unit 21, and the result of detection is sent to the control arithmetic unit 12.

Various types of programs are stored in the storage unit 13. These programs include: a sequence program for performing operations necessary for distance measurement such as driving of the rotary laser projecting device 1 and rotating the rotator 10, etc., a photodetection gain setting program for judging whether a signal from the second photodetection unit 11 is adequate or not and for calculating the value of the gain to be set, an elevation angle calculating program for calculating elevation angle based on the signal from the second photodetection unit 11, a reflection light classifying program for classifying whether the photodetection signal is the reflected light from the corner cube 9 or a reflected light from other object based on the signal from the second photodetection unit 11.

From the operation unit 14, an instruction to operate the rotary laser projecting device 1 is inputted or a measuring condition or the like is set up. The measuring condition, a state of measurement, a measurement result, a warning, an error, etc. are displayed on the display unit 15. Communication or the like to transmit information to an external display unit with individual display functions may be performed and the data may be displayed on the external display unit.

Figure 5:
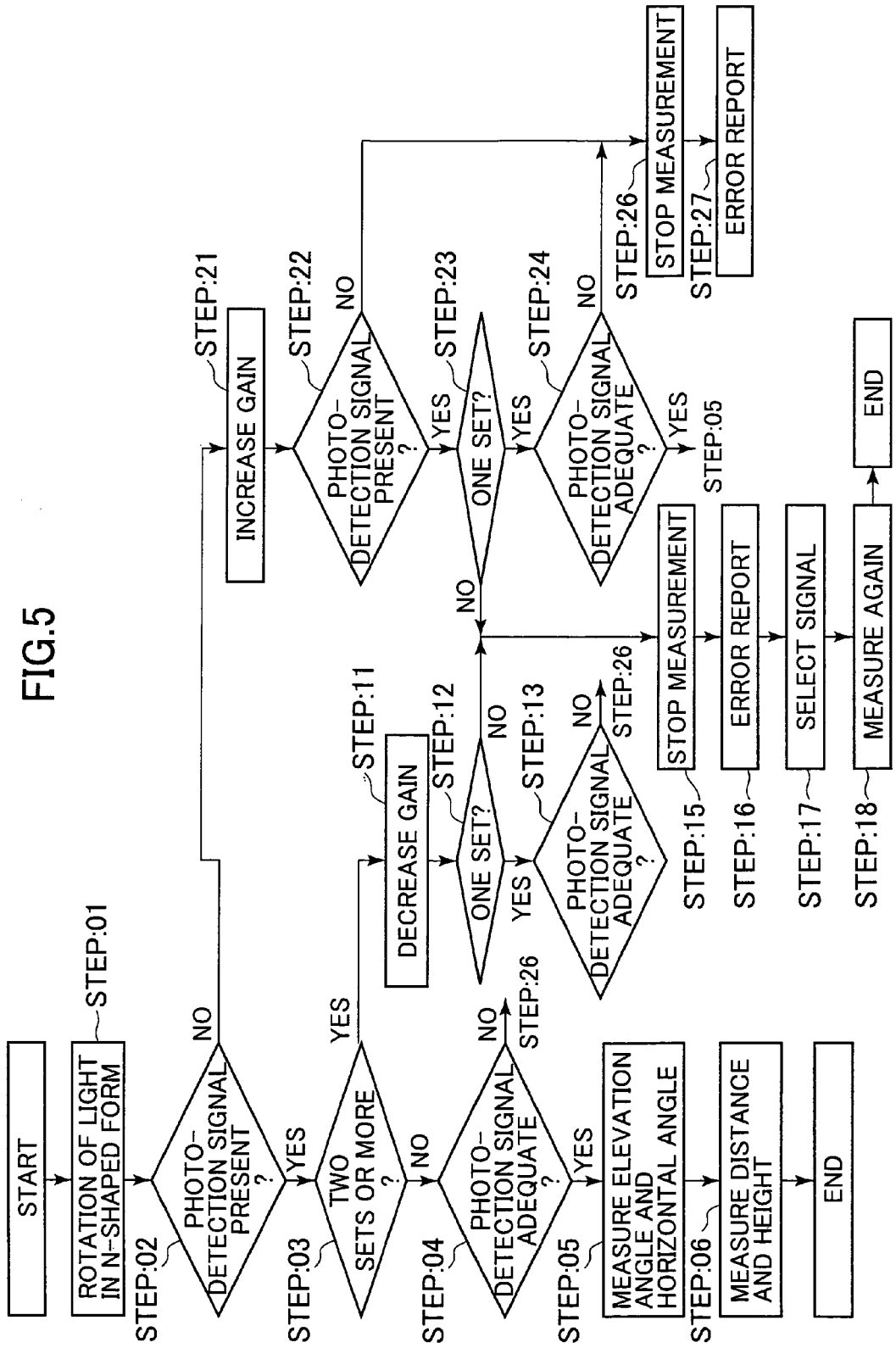
FIG. 5 is a flow chart of an operation to measure elevation angle, horizontal angle and distance by using the laser surveying system according to the present invention.

Next, referring to FIG. 5, description will be given on operation.

Here, it is assumed that measurement is performed on a single object to be measured 2.

(Step 01) An instruction to start the measurement is given to the control arithmetic unit 12 from the operation unit 14. When the measurement by the rotary laser projecting device 1 is started, the fan-shaped laser beams 5 are projected from the reference plane forming unit 3 via the reference plane formation driving unit 16, and the rotator 10 is rotated at constant velocity by the rotary driving unit 19.

During the time period when the fan-shaped laser beams 5 are rotated by one turn, the fan-shaped laser beams 5 pass the corner cube 9. The fan-shaped laser beams 5 are reflected by the corner cube 9. Then, the reflected fan-shaped laser beams 5' from the corner cube 9, i.e. the reflected fan-shaped laser beams 5a', 5b' and 5c', enter the rotary laser projecting device 1 and are received by the second photodetection unit 11, and photodetection signals are inputted in the signal processing unit 17.

At the signal processing unit 17, signal processing is performed, e.g. the signals are amplified with the gain of initial setting and is processed by A/D conversion, and the signals are transmitted to the control arithmetic unit 12 as photodetection signals.

(Step 02) With respect to the photodetection signal from the signal processing unit 17, the control arithmetic unit 12 judges whether it is a reflection light from the corner cube 9 or it is a reflection light from an unnecessary reflector.

If the reflection light is adequate, by receiving the reflected fan-shaped laser beams 5a', 5b' and 5c', three photodetection signals are outputted from the second photodetection unit 11, i.e. from the signal processing unit 17. A time interval α between the reflected fan-shaped laser beam 5a' and the reflected fan-shaped laser beam 5b' is determined on its own according to a rotational angular speed of the rotator 10. By giving consideration to a rotation error Δα, the time interval α is given as follows:

$$\alpha - \Delta\alpha \leq \text{time interval } \alpha \leq \alpha + \Delta\alpha$$

Therefore, it is judged whether three photodetection signals are obtained by a set of signals or not. Further, it is judged whether the time interval α between the first photodetection signal and the last photodetection signal has a relation as follows:

$$\alpha - \Delta\alpha \leq \text{time interval } \alpha \leq \alpha + \Delta\alpha$$

(Step 03 and Step 04) When the photodetection signals are a set of signals, and when the time interval α between the first photodetection signal and the last photodetection signal is given by the relation: $\alpha - \Delta\alpha \leq$ time interval $\alpha \leq \alpha + \Delta\alpha$, it is judged that the photodetection signal is adequate, and distance measurement is executed. When two or less or 4 or more photodetection signals are obtained by a set of photodetection signals, and when the signals does not meet the condition of $\alpha-\Delta\alpha\leqq$ time interval $\alpha\leqq\alpha+\Delta\alpha$, the signals are excluded from the object of the signal processing.

(Step 05) First, elevation angle is calculated by the time deviation of each of the three photodetection signals. Horizontal angle at the moment when the photodetection signal is obtained is determined by the horizontal angle detecting unit 21, and the elevation angle and the horizontal angle are determined.

(Step 06) A direction of the object to be measured 2 can be identified by the measured horizontal angle, and the distance measuring light 6 are projected in this direction by rotary irradiation. A reflected distance measuring light 6' reflected by the object to be measured 2 is received by the first photodetection unit 4b, and a distance measurement to the object to be measured 2 is performed. Further, based on the result of distance measurement and based on the elevation angle, the height of the object to be measurement 2 can be obtained.

Thus, three-dimensional data of the object to be measured 2 can be acquired.

In case it is judged in Step 04 that the photodetection signal is not the photodetection signal by the reflection light from the corner cube 9, e.g. in case the time interval $\alpha$ between the first photodetection signal and the last photodetection signal of the three photodetection signals does not satisfy the condition: $\alpha-\Delta\alpha\leqq$ time interval $\alpha\leqq\alpha+\Delta\alpha$, or in case only two photodetection signals can be acquired, it is shifted to Step 26, and the measurement operation is stopped. An "error" status is displayed on the display unit 15 (Step 27), and the measurement operation is terminated.

Next, in case two sets or more of the photodetection signals are found in Step 03, it is shifted to Step 11.

(Step 11) The control arithmetic unit 12 issues an instruction to the signal processing unit 17, and the gain at the signal processing unit 17 is decreased.

Normally, the reflection light from unnecessary reflector is weaker compared with the reflection light from the corner cube 9, and by decreasing the gain at the signal processing unit 17, the detection of the reflection light from unnecessary reflector at the second photodetection unit 11 can be excluded. Accordingly, the photodetection signal by the reflection light from the corner cube 9 can be extracted.

(Step 12) It is judged whether the photodetection signals are in one set or not.

(Step 13) When it is judged that the photodetection signals are in one set, it is judged whether the photodetection signal is adequate or not, i.e. whether the photodetection signal is the signal by the reflection light from the corner cube 9 or not (see Step 04). If it is judged that the signal is adequate, it is shifted to Step 05, and the elevation angle, the horizontal angle, the distance, and the height are measured.

If it is judged in Step 13 that the photodetection signal is not the signal by the reflection light from the corner cube 9, it is shifted to Step 26, and the measurement operation is stopped and an error report is issued. The details of the error report are displayed on the display unit 15. The details of the error report include, for instance: there are two or more sets of the photodetection signals, or it is impossible to determine whether two or more sets of photodetection signals are adequate or not.

Next, when it is judged in Step 12 that there are two sets or more of the photodetection signals, it is shifted to Step 15, and measurement operation is stopped.

As an example of the case there are two sets or more of photodetection signals, in case an unnecessary reflector with high reflectivity such as glass is present at very near distance, an intensity of the reflection light from the unnecessary reflector is high. In such case, even when the gain is decreased, photodetection signal on the unnecessary reflector cannot be excluded. That is, even when the gain is decreased, two or more sets of photodetection signals are detected.

In such case, horizontal angle is obtained by every photodetection signals in each set.

(Step 15 and Step 16) The measurement operation is stopped, and an error report is given on the condition of error. A details of the error report that two sets or more of photodetection signals are present, is displayed. And when horizontal angle of every photodetection signals is measured by the horizontal angle detecting unit 21, the horizontal angle is also displayed.

The operator carefully observes the measurement conditions and confirms the presence of unnecessary reflector. After confirming the direction to the object to be measured 2, the photodetection signal from the object to be measured 2 is selected and designated among two or more sets of the photodetection signals by the operation unit 14 (Step 17).

(Step 18) An instruction is given to perform measurement again, and the measurement operation is resumed. The control arithmetic unit 12 carries out the procedure of the measurement of Step 05 on the designated photodetection signals. Further, the procedures for the distance measurement and the height measurement in Step 06 are carried out.

In case the photodetection signal could not be detected in Step 02 as given above, the control arithmetic unit 12 issues an instruction to the signal processing unit 17, and the gain at the signal processing unit 17 is increased (Step 21).

(Step 22) In case the photodetection signal cannot be acquired even when the gain is increased, it is shifted to Step 26 and Step 27. Then, the measurement operation is stopped, and the error report is issued.

(Step 23) When the gain is increased and the photodetection signal is acquired, it is judged whether the photodetection signals are in one set or in two sets or more. If there are two sets or more of the photodetection signals, it is shifted to Step 15 and Step 16. The measurement operation is stopped and the error report is issued. Further, it is shifted to Step 17 and Step 18, and the selection of signals and re-measurement are conducted.

(Step 24) In case where the photodetection signals are in one set, it is judged whether the photodetection signals are adequate or not. If the photodetection signals are adequate, it is shifted to Step 05, and the measurement operation is executed. If it is judged that the photodetection signals are not adequate, it is shifted to Step 26 and Step 27. The measurement operation is stopped and the error report is issued.

According to the present invention, horizontal angle of the object to be measured 2 is determined by detecting the reflected fan-shaped laser beams 5' reflected from the object to be measured 2. Accordingly, a deviation occurs in the detection of the horizontal angle in an extent equal to the time difference in reciprocal running of the fan-shaped laser beams 5. There is no substantial influence when the object to be measured 2 is at short distance. While a measurement error appears when the object to be measured is at long distance, the measurement accuracy decreases. Accordingly, in the present invention, the measurement error is compensated by using the distance to the object to be measured 2 as determined by the distance measuring unit 4 in order to have higher measurement accuracy.

Now, referring to FIG. 6, description will be given below on an embodiment of the invention, according to which error in the measurement of horizontal angle is compensated to obtain accurate horizontal angle.

A standard clock signal T is issued from the clock generator 20 and a horizontal angles measurement timing signal $\theta$ is issued for every predetermined angle from the horizontal angle detecting unit 21. In the storage unit 13, the horizontal angle measurement timing signal θ and the standard clock signal T are associated with each other and are stored. That is, if it is assumed that the time is T1 when the horizontal angle is θ1, the horizontal angle θ1 and the time T1 are associated with each other and are stored in the storage unit 13.

When the fan-shaped laser beams 5 are projected by rotary irradiation and the position (horizontal angle θa) of the object to be measured 2 is detected, the control arithmetic unit 12 projects the distance measuring light 6 emitted from the rotator 10 within a predetermined range including horizontal angle θa by rotary irradiation. An error caused by a rotation of the rotator 10 is included in the horizontal angle θa.

The distance measuring light 6 is a pulsed light. When the distance measuring light 6 passes the corner cube 9, a reflected distance measuring light 6' is reflected by the corner cube 9. The reflected distance measuring light 6' is received by the first photodetection unit 4b. A distance to the corner cube 9 is measured, and the result of measurement is stored in the storage unit 13.

The reflected distance measuring light 6' is received by the first photodetection unit 4b. The first photodetection unit 4b issues a photodetection signal corresponding to the pulsed light of the reflected distance measuring light 6'. At the signal processing unit 17, the reflected distance measuring light 6' is detected, and a wave detection signal is generated. Then, the wave detection signal is integrated, and a position of the center of gravity is determined. The position of the center of gravity is the position of the corner cube 9, and a signal of the position of the center of gravity is outputted to the control arithmetic unit 12 from the signal processing unit 17.

The control arithmetic unit 12 compares the signal with the standard clock, and a time Tc of the position of the center of gravity is determined. The time Tc includes the time ΔT, during which the distance measuring light 6 runs reciprocally along the distance to and from the corner cube 9, i.e. the time, during which the reflected distance measuring light 6' is issued from the distance measuring unit 4 and reflected by the corner cube 9 and enters the distance measuring unit 4 again. Therefore, the time TH when the distance measuring light 6 is projected is given as: TH=(Tc−ΔT).

If it is supposed here that light velocity is C and the distance of reciprocal running between the rotary laser projecting device 1 and the object to be measured 2 is 2D, then ΔT=2D/C. The value of ΔT can be obtained by the result of the distance measurement of the distance to the object to be measured 2, which is already known.

Figure 6:
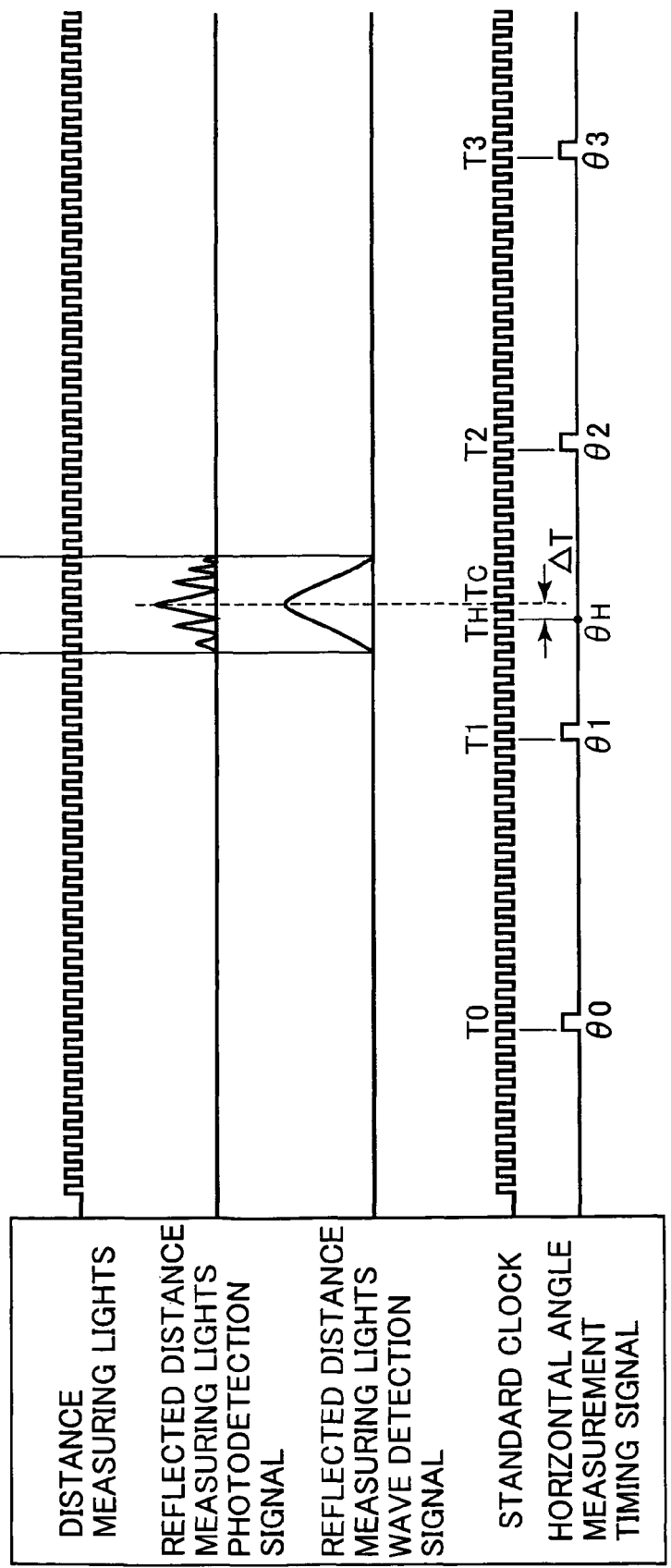
FIG. 6 is a diagram to explain signal processing when horizontal angle is measured and compensated in the laser surveying system according to the present invention.

As shown in FIG. 6, if it is supposed that TH is between T1 and T2, and T1 is associated with the horizontal angle θ1 and T2 is associated with the horizontal angle θ2, then the horizontal angle θH at TH is given by the Equation 1 as follows:

$$\theta H=(\theta 2-\theta 1)\times(TH-T1)/(T2-T1)+\theta 1 \qquad \text{(Equation 1)}$$

Therefore, the horizontal angle θH when the distance measuring light 6 is projected can be determined.

Figure 7:
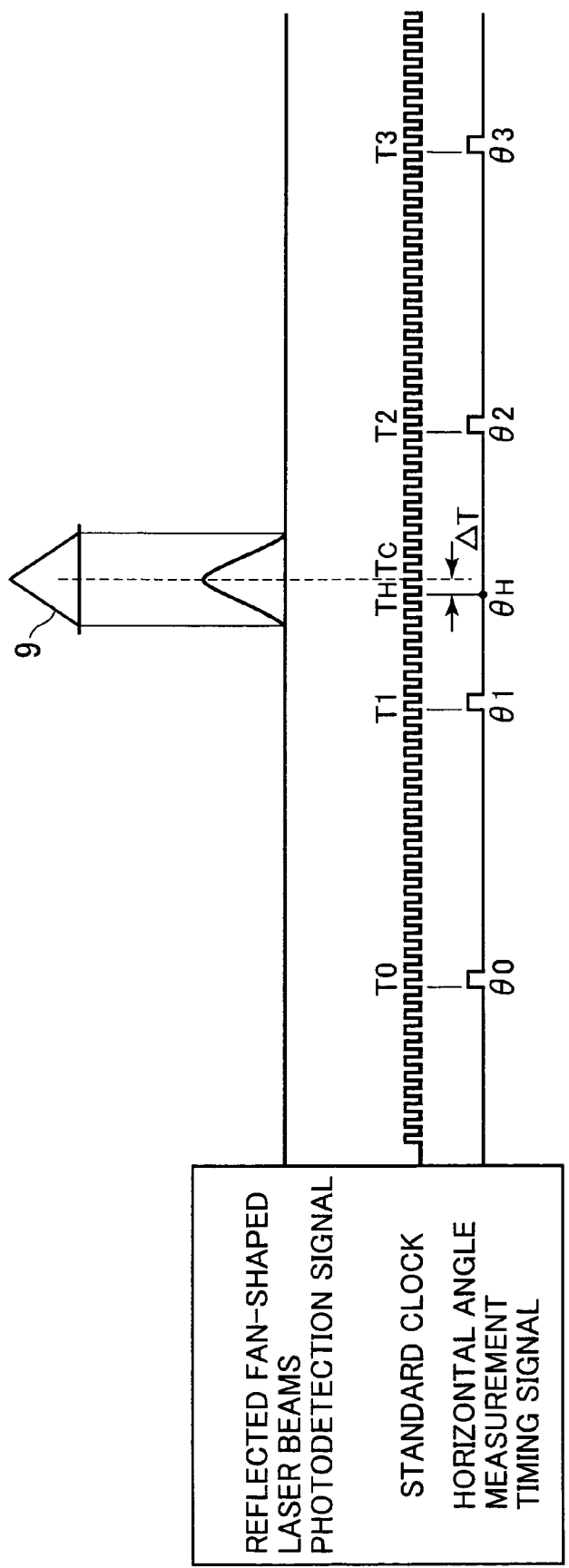
FIG. 7 is a diagram to explain another mode of signal processing when horizontal angle is measured and compensated in the laser surveying system according to the present invention.

Next, referring to FIG. 7, description will be given on another mode of the invention to compensate measurement error of the horizontal angle. A time period ΔT is needed from the moment when the fan-shaped laser beams are projected to the object to be measured until the laser beams are received. Here, the value of ΔT is determined by using a distance D measured from the distance measuring unit 4 as: ΔT=2D/C. If it is supposed that rotation speed when the rotary laser projecting device 1 projects the fan-shaped laser beams 5 by rotary irradiation is constant, and that rotational angular speed is ω, then, the angle to be compensated can be promptly obtained as: ω×ΔT. Therefore, if it is supposed that the time when the fan-shaped laser beams 5 are received is TC, the horizontal angle θH obtained by compensation is given by the Equation 2:

$$\theta H=(\theta 2-\theta 1)\times(TC-T1)/(T2-T1)-\omega\Delta T+\theta 1 \qquad \text{(Equation 2)}$$

Figure 8:
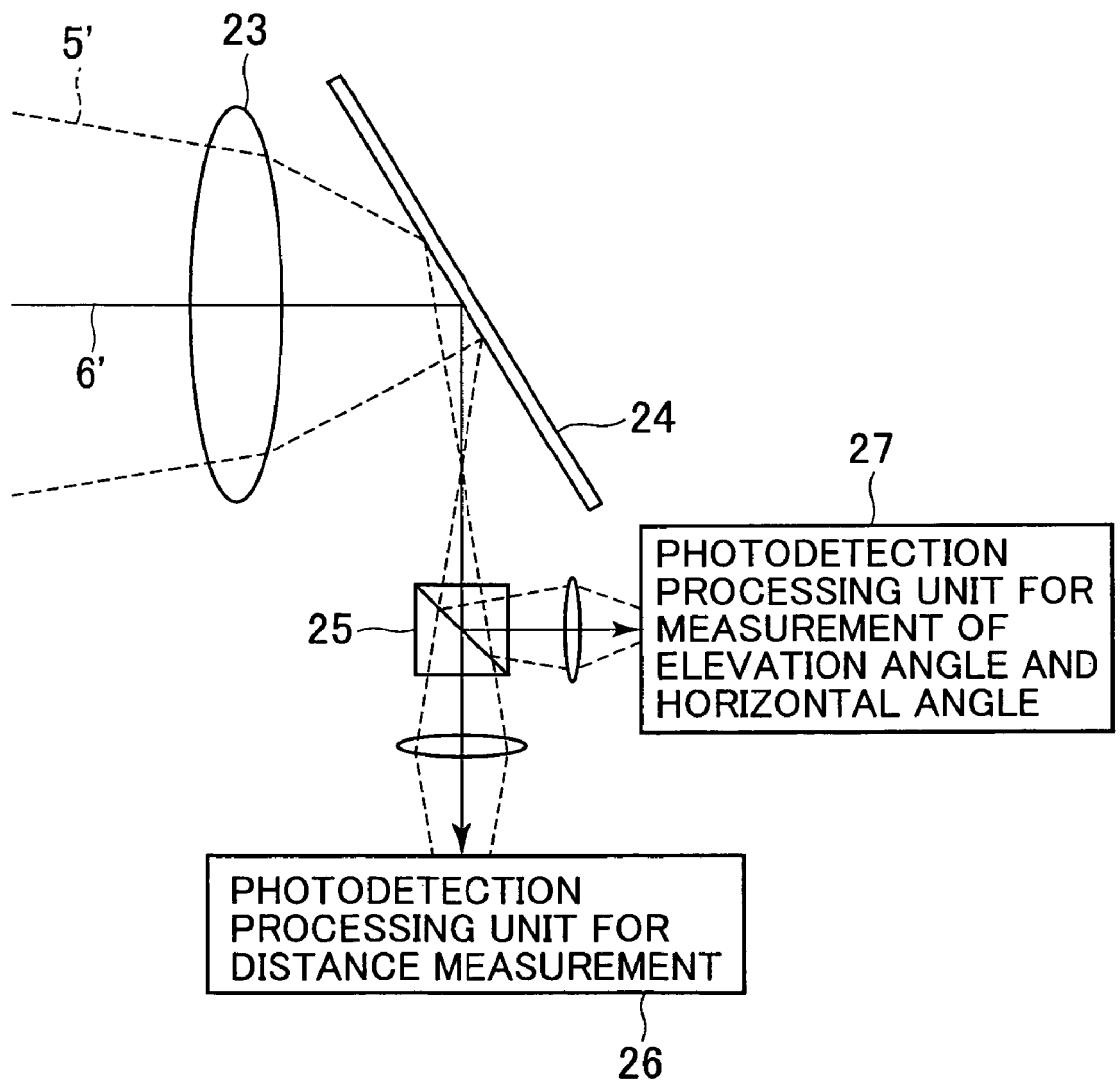
FIG. 8 is a schematical drawing to show an example of a photodetection optical system for receiving reflected fan-shaped laser beams and reflected distance measuring light in the rotary laser projecting device according to the invention.

In the embodiment as described above, it is arranged that the fan-shaped laser beams 5 and the distance measuring light 6 are projected by separating from each other at upper and lower positions and these are detected by the second photodetection unit 11 for the fan-shaped laser beams and by the first photodetection unit 4b for receiving the distance measuring light contained in the distance measuring unit, while these light beams may be projected and received along the same optical path. FIG. 8 shows approximate arrangement of a photodetection optical system on the same optical path.

Since the reflection lights of the fan-shaped laser beams 5 spread in vertical direction, a wide angle lens is used as a lens for photodetection (objective lens) 23. Upon entering, the reflection lights are converged by the objective lens 23, deflected by a reflection mirror 24, and are divided by a half-mirror 25. After passing through it, the laser beams passing through a half-mirror 25 are guided to a photodetection processing unit 26 for distance measurement, while the reflected laser beams are guided to a photodetection processing unit 27 for measurement of elevation angle and horizontal angle.

Figure 9:
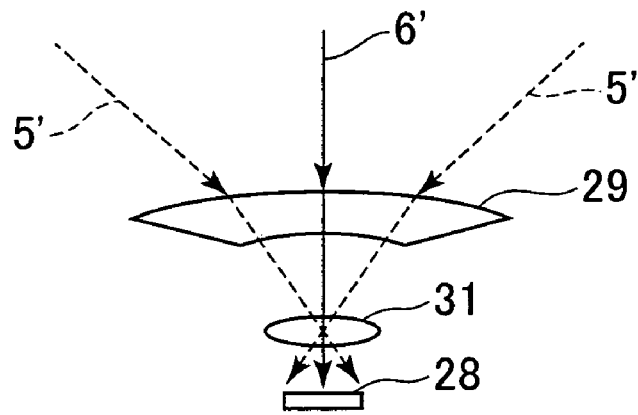
FIG. 9 is a schematical drawing to show another example of a photodetection optical system for receiving reflected fan-shaped laser beams and reflected distance measuring light in the rotary laser projecting device according to the invention.

FIG. 9 shows an example, in which the first photodetection unit 4b and the second photodetection unit 11 are designed as a single photodetection sensor 28 and the reflected fan-shaped laser beams 5', and the reflected distance measuring light 6' are received by the single photodetection sensor 28.

The reflected fan-shaped laser beams 5' and the reflected distance measuring light 6' are converged by the an objective lens 29 of wide angle, and are further converged on the photodetection sensor 28 by a condenser lens 31. As shown in FIG. 9, incident direction of the reflected fan-shaped laser beams 5' to the objective lens 29 widely varies and the converging position on the photodetection sensor 28 is also shifted according to the incident direction. Therefore, and the photodetection sensor 28 has an area as necessary.

Figure 10:
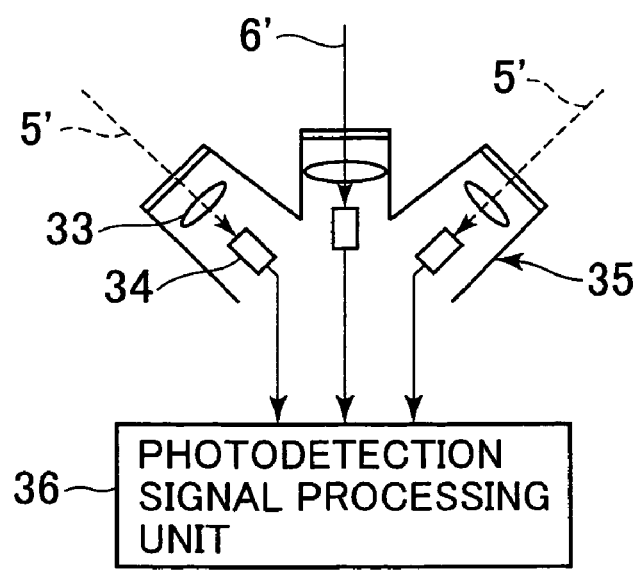
FIG. 10 is a schematical drawing to show still another example of a photodetection optical system for receiving reflected fan-shaped laser beams and reflected distance measuring light in the rotary laser projecting device according to the invention.

FIG. 10 shows an example, in which there are provided two or more sets of photodetection units 35, (three sets are shown in the figure), which comprises a condenser lens 33 and a photodetection sensor 34 so that the reflection light entering in wide range can be received. Photodetection signals from the photodetection sensor 34 of the photodetection unit 35 of each set are processed by the photodetection signal processing unit 36 and are transmitted to the control arithmetic unit 12.

Next, when two or more rotary laser projecting device 1 are installed, and the distance, the elevation angle and the horizontal angle of the object to be measured 2 are measured, it is necessary to identify and discriminate the reflected fan-shaped laser beams as received and the reflected distance measuring light as received.

In this case, at least the fan-shaped laser beams 5 among the fan-shaped laser beams 5 and the distance measuring light 6 projected from two or more rotary laser projecting device 1 is modulated so that each of the rotary laser projecting device 1 have inherent modulation frequency. The rotary laser projecting device 1 identifies modulation of the reflected fan-shaped laser beams as received and the reflected distance measuring light as received and identifies whether it is the fan-shaped laser beam 5 or the distance measuring light 6 issued by its own rotary laser projecting device 1 or not.

In the embodiment as described above, there are three fan-shaped laser beams 5, while the same effect can be attained in case there are two fan-shaped laser beams.

What is claimed is:

1. A laser surveying system, comprising a rotary laser projecting device and an object reflector,
wherein said rotary laser projecting device comprises a reference plane forming unit for forming a reference plane by projecting two or more fan-shaped laser beams which spread in vertical direction and at least one laser beam which is tilted, a distance measuring unit for measuring distance by projecting distance measuring light, a rotator for projecting said fan-shaped laser beams and said distance measuring light in horizontal direction by rotary irradiation, a horizontal angle detecting unit for detecting horizontal angle of the rotator, a photodetection unit for receiving the reflected fan-shaped laser beams and the reflected distance measuring light, a storage unit, and a control arithmetic unit for controlling said reference plane forming unit, said distance measuring unit and said rotator and wherein said object reflector reflects said fan-shaped laser beams and said distance measuring light toward said rotary laser projecting device,
wherein said control arithmetic unit measures elevation angle of said object reflector from time difference of photodetection between said two or more laser beams, measures horizontal angle of the object to be measured based on the result of detection of said horizontal angle detecting unit when at least one of said reflected fan-shaped laser beams and said reflected distance measuring light is received and said distance measuring unit measures a distance to the object to be measured, and
wherein said control arithmetic unit prepares a standard clock signal and performs matching of said standard clock signal with an angle signal from said horizontal angle detecting unit, determines time when said reflected distance measuring light is received, and based on the measured distance, calculates the time of reciprocal running of the distance measuring light between the object to be measured and a distance measuring unit, and calculates horizontal angle of the object to be measured by the time of reciprocal running when said reflected distance measuring light is received and from the matching of the standard clock signal with said angle signal.

2. A laser surveying system according to claim 1, wherein said control arithmetic unit controls constant speed rotation of said rotator, judges that photodetection signals from said photodetection unit comprise two or more photodetection signals, and judges whether said photodetection signals of two or more laser beams are photodetection signals on said object reflector or photodetection signals on unnecessary reflector other than the object reflector, depending on whether photodetection signals of said two or more laser beams are received within a predetermined time period.

3. A laser surveying system according to claim 2, further comprising a signal processing unit for processing signals from said photodetection unit, wherein said control arithmetic unit decreases gain on the photodetection signals by said signal processing unit in case where there are two or more sets of photodetection signals of said two or more laser beams received within a predetermined time period, and excludes photodetection signals from unnecessary reflector.

4. A laser surveying system according to claim 2, further comprising a signal processing unit for processing signals from said photodetection unit, wherein said control arithmetic unit increases gain on the photodetection signals by said signal processing unit in case where photodetection signal from the photodetection unit cannot be acquired.

5. A laser surveying system according to claim 2, further comprising a display unit, wherein said control arithmetic unit further comprises a signal processing unit for processing signal from said photodetection unit, and wherein said control arithmetic unit stops measurement operation and displays horizontal angle of said two or more sets of photodetection signals on said display unit in case where there are two or more sets of photodetection signals of said two or more laser beams received in a predetermined time period.

6. A laser surveying system according to claim 1, wherein said rotary laser projecting device modulates at least said fan-shaped laser beams among the projected fan-shaped laser beams and the projected distance measuring light, and said rotary laser projecting device judges whether the received reflected light is the projected fan-shaped laser beam of its own by detecting the modulation.

7. A laser surveying system according to claim 1, wherein said photodetection unit comprises a first photodetection unit for receiving the reflected distance measuring light and a second photodetection unit for receiving the reflected fan-shaped laser beam.

8. A laser surveying system according to claim 7, wherein said first photodetection unit and said second photodetection unit are designed as a common photodetection unit.

9. A laser surveying system according to claim 1, wherein the reflected fan-shaped laser beams and the reflected distance measuring light are received via the same optical path, are divided by a half-mirror, and are processed separately by a photodetection processing unit.

10. A laser surveying system according to claim 1, wherein the reflected fan-shaped laser beams and the reflected distance measuring light are received via the same optical path, wherein the photodetection unit has two or more photodetection units, wherein an optical axis of one photodetection unit concurs with the axis of said optical path, and an optical axis of another photodetection unit is tilted at a predetermined angle with respect to said optical path.

* * * * *